June 29, 1926.
L. EASTERMAN
JOINT FOR GLASS PLATES
Filed Dec. 18, 1922
1,590,890
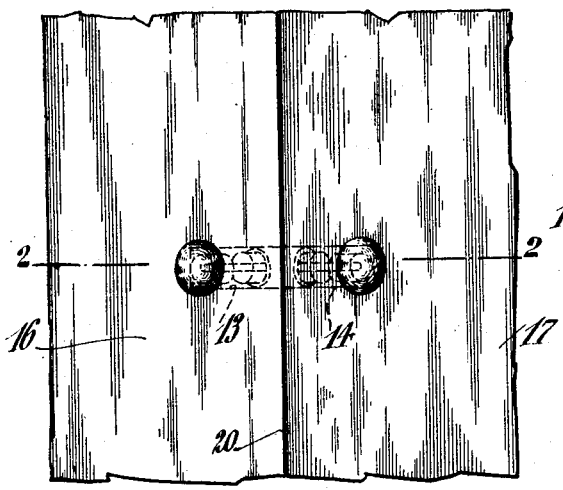
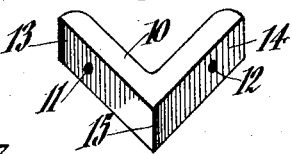
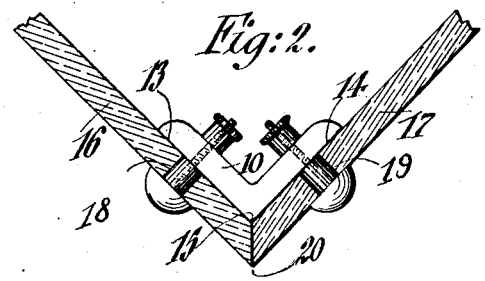
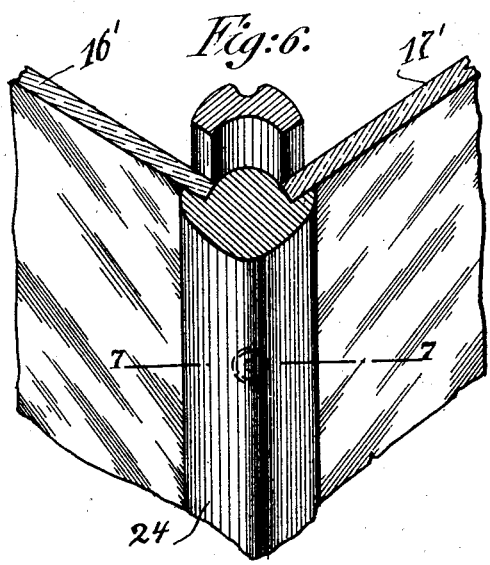
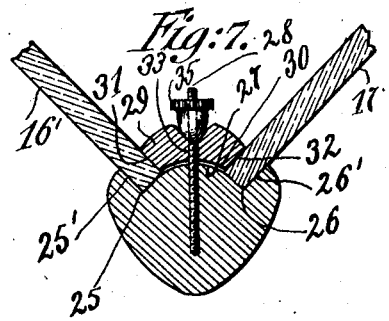
INVENTOR
Lea Easterman
BY C. P. Goepel
ATTORNEY Patented June 29, 1926.

1,590,890

UNITED STATES PATENT OFFICE.

LEA EASTERMAN, OF BROOKLYN, NEW YORK.

JOINT FOR GLASS PLATES.

Application filed December 18, 1922. Serial No. 607,469.

This invention relates to joints for plate glass windows, the object of the invention being to provide means by which it will be possible to join glass plates, mostly such as used in big show windows, in a more safe and attractive manner.

Heretofore various styles of joints for plate glass, as for instance, for show windows, have been used, all of which consist of metal. However, as those metal members usually tarnish and obscure the view of the observer, the appearance of a show window is affected, and a more attractive joint is greatly desired.

Certain difficulties were encountered in the manufacture of joints from material, such as glass, which suggests itself for its transparency and low price. I have overcome those difficulties by forming the clips holding the abutting ends of the plates, and the other parts, in the manner illustrated in the accompanying drawings and described further below.

In said drawings,

Fig. 1 represents a front elevation of a pair of window plates with my new joint;

Figure 2 is a horizontal sectional view of my improved joint taken on the line 2—2 of Figure 1.

Figs. 3, 4 and 5 are perspective views of parts of my new joint; and

Figure 6 is a perspective view of a modified form of joint showing the parts in their separated relation.

Figure 7 is a horizontal sectional view of the form shown in Figure 6, showing the parts in their assembled relation.

By way of example I shall describe my new joint in connection with a joint made of glass.

Referring to the drawings, 10 denotes the rear member in the form of a glass bracket bent in an angle of 90°, or any angle as may be necessary, provided with holes 11 and 12 in a right angle to the smooth surfaces 13 and 14, respectively, and preferably at an equal distance from the intersecting line 15 of the surfaces 13 and 14.

The smooth surfaces 13 and 14 of the glass bracket 10 are to contact with the glass plates 16 and 17, respectively, in the manner illustrated by Fig. 2, the holes 18 and 19, respectively, being provided at such distance from the line 20 in which the plates 16 and 17 abut, so as to have the holes 11 and 18 on one side and the holes 12 and 19 coaxially disposed in relation to each other.

Figs. 4 and 5 illustrate a screw and cap, respectively, which I use in connection with my new joint. 20 denotes a screw threaded bolt made of nickel or any other suitable metal, which at its one end has rigidly secured thereto the front part of the joint consisting of a ball-shaped glass button 21 with a cylindrical glass stem 22 of slightly smaller diameter than that of the holes 18 and 19; the cap 23, with a female screw thread inside, may be operatively engaged with the bolt 20. The latter is inserted on the one side through hole 18 and hole 11 of the glass bracket 10 held against the plate 16, and on the other side a like bolt is inserted through holes 19 and 12 of the glass plate 17 and glass bracket 10, respectively, and by engaging said bolts 20 with cap 23, and turning the said cap as far as possible the glass bracket 10 presses the plates 16 and 17 together, and owing to the correct distances and measurements as indicated above, the inclined edges of the glass plates abut in line 20; the cylindrical stem 22, owing to its diameter being slightly smaller than that of the holes 18 and 19 and of a length corresponding with the thickness of the glass plate, fills entirely said holes with glass so that only the parts absolutely necessary to give the proper strength are of metal.

The surfaces of the glass button 21 and those of the bracket 10 are parallel to each other, and thus give a perfect and attractive joint.

In Figs. 6 and 7, I show a modified form of my invention. In the same the glass plates 16' and 17' do not abut directly, but are joined by a rabbet 24, made of glass, and having two recesses or corners 25 and 26 into which the plates 16' and 17' are set. The rabbet 24 has a rounded projection 27 and coinciding substantially with the symmetrical axis of said rabbet a screw threaded bolt 28 is rigidly secured therein. 29 is a bar, made of glass, having a curved surface 30 and plane walls 31 and 32. In its middle it has a bore 33 of such diameter to fit snugly over the screw threaded bolt 28, and on the side opposite to the curved surface 30 it is provided with a rounded groove 34. A nut 35 of such shape as to fit into the groove 34 is put over the bolt 28. It is evident from an inspection of Figs. 6 and 7 that the bar 29 with its walls 31 and 32 and the curved surface 30 registers with the opposite plates 16' and 17' and the projection 27 of rabbet 24, respectively, when the nut 35 is turned so as to tighten the bar 29 unto rabbet 24, and to thus tighten the glass plates between same. It will be noted that the walls 25' and 26' of the corners 25 and 26, respectively, are parallel to the walls 31 and 32 of the bar 29 and that all these surfaces are parallel to the respective glass plates whereby a perfectly tight joint is effected.

In view of the fact that the edges of the glass plates do not abut directly but are joined by the rabbet 24 interposed between them, it is natural that the rabbet enters all along the height of the plates to be joined and, therefore, a plurality of bolts 28 is distributed all along its length.

Though I disclose the embodiment of my invention by the two modifications described above I am aware that the same can be changed in various aspects without departing from the spirit of my invention or sacrificing the advantages of same, and any such change will be claimed as coming within the spirit and scope of my invention.

What I claim is:

1. In a transparent joint for glass plates, in connection with such glass plates the combination of a transparent front member, a bolt rigidly secured with one end in said transparent front member, a perforated transparent rear member adapted to register with the plates in the angle in which they are to be joined, and means adapted to operatively engage with the aforesaid bolt to tighten the glass plates between the transparent front and rear members.

2. In a transparent joint for glass plates, in connection with such glass plates the combination of a transparent front member, a bolt rigidly secured with one end in said transparent front member, a perforated transparent rear member adapted to register with the front member and the glass plates in the angle in which they are to be joined, and means adapted to operatively engage with the aforesaid bolt to tighten the glass plates between the transparent front and rear members.

3. In a transparent joint for glass plates, in connection with such glass plates the combination of a transparent front member having at least one plane surface, a bolt rigidly secured with one end in said transparent front member, a perforated transparent rear member having plane surfaces adapted to register with the plates in the angle in which they are to be joined, and means to operatively engage with the aforesaid bolt to tighten the glass plates between the parallel plane surfaces of the transparent front and rear members.

4. In a transparent joint for glass plates, in connection with such glass plates the combination of a transparent front member having a plurality of plane surfaces adapted to register with the glass plates in the angle in which they are to be joined, a bolt rigidly secured with one end in said transparent front member, a perforated transparent rear member having plane surfaces adapted to register with the plates in the angle in which they are to be joined, and means to operatively engage with the aforesaid bolt to tighten the glass plates between the parallel plane surfaces of the transparent front and rear members.

5. In a glass joint for glass plates, in connection with such glass plates the combination of a glass front member, a screw threaded bolt rigidly secured with one end in said glass front member, a perforated glass rear member adapted to register with the plates in the angle in which they are to be joined, and a screw threaded nut adapted to engage said bolt to tighten the glass plates between the glass front and rear members.

6. In a glass joint for glass plates, in connection with such glass plates the combination of a glass front member with a glass stem as long and thick to fill the perforations in the glass plates in which the joint is screwed, a screw threaded bolt rigidly secured with one end in said glass front member, a perforated glass rear member adapted to register with the plates in the angle in which they are to be joined, and a screw threaded nut adapted to engage said bolt to tighten the glass plates between the glass front and rear members.

7. In a transparent joint for glass plates, in combination with two glass plates, bolts extending through said glass plates, and having reduced screw threaded ends beyond the glass plates, and a perforated transparent rear member having openings adapted to register with the reduced portions of the bolts, and nuts on said reduced screw threaded portions on the inside of the transparent perforated rear member and adapted to clamp the two glass plates together.

8. In a transparent joint for glass plates, the combination with a transparent front member having two spaced rabbets adapted to receive the two glass plates, a bolt rigidly secured to the transparent front plate between the rabbets and the perforated transparent rear member having plane surfaces adapted to engage the glass plates opposite the rabbets, and means on the inner end of the bolt for locking the two glass plates between the front and rear transparent members.

In testimony that I claim the foregoing as my invention, I have signed my name hereunder.

LEA EASTERMAN.